(12) United States Patent
Kang et al.

(10) Patent No.: US 9,777,088 B2
(45) Date of Patent: Oct. 3, 2017

(54) HEAT-RESISTANT SAN RESIN, METHOD OF PRODUCING THE SAME AND HEAT-RESISTANT SAN RESIN COMPOSITION COMPRISING THE SAME

(71) Applicant: LG CHEM, LTD., Seoul (KR)

(72) Inventors: Byoung Il Kang, Daejeon (KR); Eun Jung Choi, Daejeon (KR); Da Eun Sung, Daejeon (KR); Chang Hun Han, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 15/106,785

(22) PCT Filed: Dec. 14, 2015

(86) PCT No.: PCT/KR2015/013674
§ 371 (c)(1),
(2) Date: Jun. 20, 2016

(87) PCT Pub. No.: WO2016/175423
PCT Pub. Date: Nov. 3, 2016

(65) Prior Publication Data
US 2017/0121436 A1    May 4, 2017

(30) Foreign Application Priority Data
Apr. 27, 2015 (KR) .................. 10-2015-0058723

(51) Int. Cl.
*C08F 212/10* (2006.01)
*C08F 279/04* (2006.01)
*C08L 25/12* (2006.01)

(52) U.S. Cl.
CPC .......... *C08F 212/10* (2013.01); *C08F 279/04* (2013.01); *C08L 25/12* (2013.01); *C08F 2500/01* (2013.01); *C08F 2800/20* (2013.01); *C08L 2201/08* (2013.01)

(58) Field of Classification Search
CPC .... C08L 212/10; C08L 25/12; C08L 2201/08; C08L 2205/025; C08F 2500/01; C08F 2800/20
See application file for complete search history.

(56) References Cited

U.S. PATENT DOCUMENTS

| 4,721,752 A | 1/1988 | Schepers et al. |
| 4,755,576 A | 7/1988 | Zabrocki et al. |
| 4,795,780 A | 1/1989 | Wingler et al. |
| 4,874,829 A | 10/1989 | Schwier et al. |
| 5,236,990 A | 8/1993 | Vilasagar |
| 5,254,650 A | 10/1993 | Fukumura |
| 5,302,646 A | 4/1994 | Vilasagar et al. |
| 6,316,527 B1 | 11/2001 | Meyer et al. |

FOREIGN PATENT DOCUMENTS

| JP | H06-001883 A | 1/1994 |
| JP | H06-329852 A | 11/1994 |
| JP | H07-001629 A | 1/1995 |
| JP | H10-025422 A | 1/1998 |
| JP | 2005-002316 A | 1/2005 |
| JP | 2005-220344 A | 8/2005 |
| KR | 10-0154910 B1 | 12/1998 |
| KR | 10-0374673 B1 | 10/2003 |

OTHER PUBLICATIONS

International Search Report for International Patent Application No. PCT/KR2015/013674 filed Dec. 14, 2015.

*Primary Examiner* — Nathan M Nutter

(57) ABSTRACT

Disclosed are a heat-resistant SAN resin, a method of producing the same and a heat-resistant SAN resin composition comprising the same. More specifically, disclosed are a heat-resistant SAN resin produced using ingredients comprising 52 to 78% by weight of alpha-methylstyrene, 20 to 40% by weight of a vinyl cyanide compound and 2 to 8% by weight of hydroxyalkyl (meth)acrylate, a method of producing the same and a heat-resistant SAN resin composition comprising the same. Advantageously, provided are a heat-resistant SAN resin with maintained heat resistance, improved polymerization conversion rate and increased weight average molecular weight, a method of producing the same, and a heat-resistant SAN resin composition containing the same with excellent chemical resistance, superior mechanical properties and good balance between properties.

14 Claims, No Drawings

US 9,777,088 B2

HEAT-RESISTANT SAN RESIN, METHOD OF PRODUCING THE SAME AND HEAT-RESISTANT SAN RESIN COMPOSITION COMPRISING THE SAME

TECHNICAL FIELD

The present application is a U.S. National Stage of PCT/KR2015/013674, filed Dec. 14, 2015, which claims priority to Korean Patent Application No. 10-2015-0058723 filed on Apr. 27, 2015 in the Republic of Korea, the disclosures of which are incorporated herein by reference.

The present invention relates to a heat-resistant SAN resin, a method of producing the same and a heat-resistant SAN resin composition comprising the same and more specifically, to a heat-resistant SAN resin with maintained heat resistance, improved polymerization conversion rate and increased weight average molecular weight and a method of producing the same and a heat-resistant SAN resin composition containing the same with excellent chemical resistance, superior mechanical properties and good balance between properties.

BACKGROUND ART

A styrene-acrylonitrile (SAN) resin which is a copolymer resin produced by polymerization of styrene and acrylonitrile is known to have good transparency, chemical resistance, rigidity or the like. Such a SAN resin is widely used in automobile interiors, household appliance housings and the like in combination with an acrylonitrile-butadiene-styrene (ABS) resin. In particular, the automobile interiors and the like are always exposed to high heat and chemical environments, thus requiring high heat resistance and chemical resistance.

In this regard, in order to impart high heat resistance to the SAN resin, alpha-methylstyrene monomers are generally incorporated, but more oligomers are produced and heat resistance is thus deteriorated when polymerization temperatures are decreased due to low depolymerization temperature of alpha-methylstyrene. For this reason, unlike typical SAN polymerization, polymerization is conducted at low polymerization temperatures. However, when the polymerization temperature is excessively low, there occur problems of deterioration in polymerization rate and polymerization conversion rate. In addition, when a reaction retention time is lengthened or an excess initiator is used so as to solve these problems, there occur problems of deterioration in molecular weight and production efficiency. As a result, overall physical properties including heat resistance and chemical resistance are deteriorated due to low molecular weight and more defects are disadvantageously generated upon product formation.

PRIOR ART DOCUMENT

Patent Document

Patent Document 1. U.S. Pat. No. 5,254,650 A
Patent Document 2. U.S. Pat. No. 4,874,829 A
Patent Document 3. U.S. Pat. No. 4,795,780 A
Patent Document 4. U.S. Pat. No. 4,755,576 A

DISCLOSURE

Technical Problem

Therefore, the present invention has been made in view of the above problems, and it is one object of the present invention to provide a heat-resistant SAN resin with maintained heat resistance, improved polymerization conversion rate and increased weight average molecular weight.

It is another object of the present invention to provide a method of producing the heat-resistant SAN resin.

It is another object of the present invention to provide a heat-resistant SAN resin composition containing the heat-resistant SAN resin with excellent chemical resistance, superior mechanical properties and good balance between properties.

The objects and other objects of the present invention can be accomplished by the present invention described below.

Technical Solution

In accordance with the present invention, the above and other objects can be accomplished by the provision of a heat-resistant SAN resin produced using ingredients comprising 52 to 78% by weight of alpha-methylstyrene, 20 to 40% by weight of a vinyl cyanide compound and 2 to 8% by weight of hydroxyalkyl (meth)acrylate.

In accordance with another aspect of the present invention, there is provided a method of producing a heat-resistant SAN resin comprising a step for bulk polymerizing ingredients including 52 to 78% by weight of alpha-methylstyrene, 20 to 40% by weight of a vinyl cyanide compound and 2 to 8% by weight of hydroxyalkyl (meth)acrylate.

In accordance with yet another aspect of the present invention, there is provided a heat-resistant SAN resin composition comprising: a heat-resistant SAN resin polymerized using ingredients including 52 to 78% by weight of alpha-methylstyrene, 20 to 40% by weight of a vinyl cyanide compound and 2 to 8% by weight of hydroxyalkyl (meth) acrylate; and an ABS resin.

Effects of the Invention

The present invention advantageously provides a heat-resistant SAN resin with maintained heat resistance, improved polymerization conversion rate and increased weight average molecular weight.

In addition, the present invention advantageously provides a method of producing the heat-resistant SAN resin.

In addition, the present invention advantageously provides a heat-resistant SAN resin composition which contains the heat-resistant SAN resin and thus exhibits excellent chemical resistance, superior mechanical properties and good balance between properties.

BEST MODE

Hereinafter, the present invention will be described in detail.

The present inventors found that, when hydroxyalkyl (meth)acrylate as a novel hydrophilic monomer is applied to a SAN resin polymerized using ingredients containing a copolymer of alpha-methylstyrene and a vinyl cyanide compound, properties of conventional heat-resistant styrene-based resins are maintained, polymerization conversion rate is improved and weight average molecular weight is increased, and that a SAN resin composition containing the same has excellent chemical resistance, superior mechanical properties and good balance between properties. Based on these findings, the present invention has been completed.

The heat-resistant SAN resin according to the present invention will be described in detail.

The heat-resistant SAN resin is polymerized using ingredients comprising 52 to 78% by weight of alpha-methylstyrene, 20 to 40% by weight of a vinyl cyanide compound and 2 to 8% by weight of hydroxyalkyl (meth)acrylate.

The content of the alpha-methylstyrene may for example be 58 to 72% by weight or 63 to 69% by weight. Within this range, there are advantages of superior heat resistance and maintained polymerization conversion rate.

The vinyl cyanide compound may for example be one or more selected from the group consisting of acrylonitrile, methacrylonitrile and ethacrylonitrile.

The content of the vinyl cyanide compound may for example be 25 to 35% by weight or 27 to 33% by weight. Within this range, there are advantages of superior polymerization conversion rate, heat resistance, chemical resistance and impact resistance.

The hydroxyalkyl (meth)acrylate may for example be one or more selected from the group consisting of hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate.

Specifically, the hydroxyalkyl (meth)acrylate may for example be hydroxyethyl acrylate or hydroxyethyl methacrylate.

The content of the hydroxyalkyl (meth)acrylate may for example be 3 to 7% by weight. Within this range, polymerization of copolymers having a high weight average molecular weight is possible and there are advantages of superior polymerization conversion rate and chemical resistance.

The heat-resistant SAN resin may for example have an oligomer content of 0.1 to 0.8% by weight, 0.3 to 0.6% by weight, or 0.4 to 0.5% by weight. Within this range, there is an advantage of superior heat resistance.

The heat-resistant SAN resin may for example have a weight average molecular weight of 79,000 g/mol or more, 79,000 to 95,500 g/mol or 80,000 to 93,000 g/mol. Within this range, there are advantages of superior impact resistance and heat resistance.

The heat-resistant SAN resin may for example have a glass transition temperature (Tg) of 124.3° C. or higher, 125 to 135° C. or 125.1 to 130° C. Within this range, there is an advantage of good balance between heat resistance and impact resistance.

A method of producing a heat-resistant SAN resin according to the present invention will be described below.

The method of producing a heat-resistant SAN resin comprises a step for bulk polymerization using ingredients including 52 to 78% by weight of alpha-methylstyrene, 20 to 40% by weight of a vinyl cyanide compound and 2 to 8% by weight of hydroxyalkyl (meth)acrylate.

The bulk polymerization may for example be continuous polymerization.

The continuous polymerization means continuously conducting the overall polymerization process including incorporation of respective monomers and extraction of polymerized heat-resistant SAN resin.

The bulk polymerization may for example have a polymerization conversion rate of 63 to 76%, 64 to 73% or 65 to 72%. Within this range, a significant increase in viscosity is inhibited in a reactor and there are thus advantages of easy process and superior production efficiency.

The bulk polymerization may for example be conducted at 105 to 120° C., 108 to 117° C., or 110 to 115° C. Within this range, there are advantages of superior polymerization conversion rate and heat resistance.

The method of producing a heat-resistant SAN resin may for example include adding 0.1 to 50 parts by weight, 0.1 to 30 parts by weight, or 0.1 to 10 parts by weight of a hydrocarbon solvent to 100 parts by weight of a monomer mixture including 52 to 78% by weight of alpha-methylstyrene, 20 to 40% by weight of a vinyl cyanide compound and 2 to 8% by weight of hydroxyalkyl (meth)acrylate before polymerization. Within this range, there is an advantage in which excessive increase in viscosity and decrease in conversion rate upon polymerization are inhibited.

The hydrocarbon solvent is not particularly limited so long as it can be used for preparation of SAN resin by bulk polymerization, but may for example include one or more selected from the group consisting of toluene, ethyl benzene, methylethylketone and xylene.

The method of producing a heat-resistant SAN resin may for example include adding 0.01 to 1 part by weight, 0.05 to 0.5 part by weight, or 0.1 to 0.3 part by weight of an initiator to 100 parts by weight of the monomer mixture, followed by polymerization. Within this range, there is an advantage of increased weight average molecular weight.

The initiator may for example include one or more selected from the group consisting of 1,1-bis(t-butylperoxy)cyclohexane, t-butylperoxy-2-ethylhexanoate, benzoyl peroxide, t-butylperoxyisobutyrate, 2,2-bis(4,4-di-t-butylperoxy cyclohexane) propane, t-hexylperoxyisopropyl monocarbonate, t-butylperoxylaurate, t-butylperoxy isopropyl monocarbonate, t-butylperoxy 2-ethylhexyl monocarbonate, t-hexyl peroxybenzoate, t-butylperoxyacetate, 2,2-bis(t-butylperoxy)butane, t-butylperoxybenzoate, dicumyl peroxide, 2,5-dimethyl-2,5-bis(t-butylperoxy)hexane, t-butylcumyl peroxide, di-t-butyl peroxide and di-t-amyl peroxide.

The method of producing a heat-resistant SAN resin may for example include removing unreacted monomers and the hydrocarbon solvent by volatilization at 25 torr or less, or to 25 torr after the polymerization. Within this range, there are advantages of low oligomer content and high heat resistance.

The removal of the unreacted monomer and the solvent by volatilization may for example be conducted at 200 to 250° C., or 220 to 250° C. Within this range, there are advantages of decreased residual monomer and oligomer contents.

The heat-resistant SAN resin composition according to the present invention will be described below.

The heat-resistant SAN resin composition comprises: a heat-resistant SAN resin polymerized using ingredients including 52 to 78% by weight of alpha-methylstyrene, 20 to 40% by weight of a vinyl cyanide compound and 2 to 8% by weight of hydroxyalkyl (meth)acrylate; and an ABS resin.

The heat-resistant SAN resin may for example be present in an amount of 60 to 90% by weight, 65 to 85% by weight, or 70 to 80% by weight. Within this range, there are advantages of superior heat resistance and chemical resistance.

The ABS resin may for example be present in an amount of 10 to 40% by weight, 15 to 35% by weight, or 20 to 30% by weight. Within this range, there is an advantage of superior impact resistance.

The ABS resin may for example be a vinyl cyanide compound-conjugated diene-vinyl aromatic compound copolymer.

The vinyl cyanide compound-conjugated diene-vinyl aromatic compound copolymer may for example be 5 to 40% by weight of a vinyl cyanide compound, 30 to 70% by weight of conjugated diene and 20 to 65% by weight of a vinyl aromatic compound.

The vinyl cyanide compound may for example be one or more selected from the group consisting of acrylonitrile, methacrylonitrile and ethacrylonitrile.

The conjugated diene may for example be one or more selected from the group consisting of 1,3-butadiene, 2,3-dimethyl-1,3-butadiene, 2-ethyl-1,3-butadiene, 1,3-pentadiene and isoprene.

The vinyl aromatic compound may for example be one or more selected from the group consisting of styrene, alpha-methylstyrene, ortho-ethylstyrene, para-ethylstyrene and vinyl toluene.

The heat-resistant SAN resin composition may for example have a tensile elongation of 23% or higher, 23 to 50%, or 25 to 35%.

The heat-resistant SAN resin composition may for example have an impact strength of 19 J/m or higher, 19 to 40 J/m, or 22 to 30 J/m.

The heat-resistant SAN resin composition may for example have a melt index (220° C., 10 kg) of 5 to 10 g/10 min, 6 to 10 g/10 min, or 6 to 9 g/10 min.

The heat-resistant SAN resin composition may for example have an environmental stress cracking resistance (ESCR) obtained by measuring a crack generation time after placing a thinner in the center of a specimen using a 1% strain jig, of 28 seconds or longer, 28 seconds to 100 seconds, or 30 seconds to 90 seconds.

The heat-resistant SAN resin composition may for example further include an antioxidant.

The antioxidant may for example be a hindered phenolic antioxidant, a phosphorous antioxidant or a mixture thereof. In this case, there are advantages of superior heat resistance and chemical resistance.

An article according to the present invention is produced from the heat-resistant SAN resin composition.

The article may for example be an automobile interior or a household appliance housing.

Although preferred examples of the present invention will be provided for better understanding of the present invention, these examples are provided only for illustration of the present invention. Those skilled in the art will appreciate that various modifications, additions and substitutions are possible, without departing from the scope and spirit of the invention as disclosed in the accompanying claims. Obviously, such modifications, additions and substitutions fall under the scope of the claims.

Example

Examples 1 to 5 and Comparative Examples 1 to 4

Preparation of Heat-Resistant SAN Resin 3 parts by weight of toluene was mixed with 100 parts by weight of a monomer mixture including alpha-methylstyrene (AMS), acrylonitrile (AN) and hydroxyethyl methacrylate (HEMA) used in contents (% by weight) described in the following Table 1 to prepare a mixed solution.

0.2 part by weight of 1,1-bis(t-butylperoxy)cyclohexane as an initiator was added to the mixed solution to prepare a polymerization solution, the polymerization solution was continuously fed to a series of reactors at 112° C. and polymerized for 6 hours at 230° C., the unreacted monomer and the solvent were removed in a volatilization bath under a vacuum of 15 to 30 torr and the residue was fed to a die and a pelletizer to produce a pellet-type heat-resistant SAN resin. Physical properties of the produced SAN resin were measured.

TABLE 1

| Items | Example | | | | | Comparative Example | | | |
|---|---|---|---|---|---|---|---|---|---|
|  | 1 | 2 | 3 | 4 | 5 | 1 | 2 | 3 | 4 |
| AMS | 68 | 66 | 64 | 63 | 64 | 71 | 70 | 62 | 60 |
| AN | 29 | 29 | 29 | 29 | 28 | 29 | 29 | 29 | 29 |
| HEMA | 3 | 5 | 7 | 8 | 8 | 0 | 1 | 9 | 11 |

Preparation of Heat-Resistant SAN Resin Composition 75 parts by weight of the prepared heat-resistant SAN resin was mixed with 25 parts by weight of a powder-type ABS resin (10% by weight of acrylonitrile, 60% by weight of butadiene and 30% by weight of styrene), 0.2 part by weight of Irganox 1076 and 0.2 part by weight of Irgafos 168 as antioxidants were added to the mixture, and the resulting mixture was fed into a 240° C. extruder (28Φ) to produce a pellet-type heat-resistant SAN resin composition. The SAN resin composition was injection-molded to produce a specimen and physical properties of the specimen were measured.

Test Example

Properties of heat-resistant SAN resins produced in Examples 1 to 5 and Comparative Examples 1 to 4 were measured in accordance with the following method and are shown in Table 2. Similarly, properties of heat-resistant SAN resin compositions produced in Example 1 to 5 and Comparative Example 1 to 4 were measured in accordance with the following method and are shown in Table 3.

Measurement Method

Glass transition temperature (Tg, ° C.): measured using Pyris 6 DSC available from PerkinElmer, Inc.

Polymerization conversion rate (%): 2 g of a produced heat-resistant SAN copolymer latex was dried in a hot air drier at 150° C. for 15 minutes, the weight of the latex was measured, total solid content (TSC) was obtained, and a polymerization conversion rate was calculated in accordance with the following Equation 1.

Polymerization conversion rate=total solid content (TSC)×(total parts by weight of added monomers and other ingredients)/100−(parts by weight of other ingredients excluding the added monomers)     [Equation 1]

Oligomer content: calculated as an area ratio using gel permeation chromatography (GPC).

Weight average molecular weight (Mw, g/mol): a value relative to a polystyrene standard (PS) sample was measured by gel chromatography (GPC).

Tensile strength (TS, MPa): measured using a specimen in accordance with standard test method, ASTM D638.

Tensile elongation (TE, %): using a specimen in accordance with a standard test method, ASTM D638.

Impact strength (Izod impact strength, J/m): using a ¼" specimen in accordance with a standard test method, ASTM D256.

Melt index (MI, g/10 min): measured at 220° C. under a load of 10 kg for 10 minutes using a specimen in accordance with a standard test method, ASTM D1238.

Heat deflection temperature (HDT, ° C.): using a specimen in accordance with a standard test method, ASTM D648.

Chemical resistance (ESCR, sec): crack generation time was measured after applying a thinner to the middle of a specimen using a 1% strain jig.

TABLE 2

| Items | Unit | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Glass transition temperature | (° C.) | 125.2 | 125.3 | 125.2 | 125.1 | 125.3 | 125.2 | 125.2 | 124.2 | 123.1 |
| Polymerization conversion rate | (%) | 65.6 | 67.0 | 70.2 | 72.0 | 71.4 | 62.1 | 62.8 | 73.1 | 76.2 |
| Weight average molecular weight | (g/mol) | 83,000 | 89,000 | 92,000 | 93,500 | 93,000 | 78,000 | 78,400 | 93,300 | 96,000 |
| Oligomer content | (% by weight) | 0.5 | 0.5 | 0.4 | 0.4 | 0.4 | 0.6 | 0.6 | 0.4 | 0.4 |

As can be seen from Table 2, Examples 1 to 5 produced according to contents satisfying the ranges defined in the present invention exhibited identical or similar glass transition temperature, improved polymerization conversion rate, increased weight average molecular weight and decreased oligomer content, as compared to Comparative Example 1 which corresponds to a conventional SAN resin containing no hydroxyethyl methacrylate.

On the other hand, it could be seen that Comparative Example 2 produced using alpha-methylstyrene and hydroxyethyl methacrylate in contents not satisfying the ranges defined in the present invention exhibited no improved effects and Comparative Examples 3 and 4 exhibited increased polymerization conversion rate and weight average molecular weight, but a decrease in glass transition temperature which most greatly affects heat resistance.

TABLE 3

| Items | Unit | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Tensile strength | (MPa) | 580 | 563 | 570 | 556 | 564 | 579 | 570 | 562 | 560 |
| Tensile elongation | (%) | 26 | 29 | 33 | 32 | 31 | 21 | 22 | 36 | 31 |
| Impact strength | (J/m) | 24 | 26 | 28 | 28 | 27 | 18 | 18 | 31 | 28 |
| Melt index | (g/10 min) | 9 | 8 | 7 | 6 | 6 | 10 | 10 | 6 | 5 |
| Heat deflection temperature | (° C.) | 102 | 102 | 102 | 102 | 102 | 102 | 102 | 101 | 99 |
| Chemical resistance | (sec) | 34 | 52 | 71 | 76 | 74 | 21 | 27 | 102 | 123 |

As can be seen from Table 3, Examples 1 to 5 produced according to contents satisfying the ranges defined in the present invention exhibited identical or similar tensile strength and heat deflection temperature, remarkably improved tensile elongation and impact strength, and thus superior mechanical properties and good balance between properties, and superior chemical resistance.

On the other hand, it could be seen that Comparative Example 2 produced using alpha-methylstyrene and hydroxyethyl methacrylate in contents not satisfying the ranges defined in the present invention exhibited no improved effect and Comparative Examples 3 and 4 exhibited poor balance between physical properties and a decrease in glass transition temperature which most greatly affects heat resistance.

Consequently, the heat-resistant SAN resin of the present invention, which comprises hydroxyalkyl (meth)acrylate as a novel hydrophilic monomer in conjunction with alpha-methylstyrene and a vinyl cyanide compound, has maintained properties of conventional heat-resistant styrene-based resins, improved polymerization conversion rate and increased weight average molecular weight. A SAN resin composition containing the same is expected to have advantages of excellent chemical resistance, superior mechanical properties and balance between properties.

What is claimed is:

1. A heat-resistant SAN resin produced using ingredients comprising 52 to 78% by weight of alpha-methylstyrene, 20 to 40% by weight of a vinyl cyanide compound and 2 to 8% by weight of hydroxyalkyl (meth)acrylate,
    wherein the heat-resistant SAN resin has a weight average molecular weight of 79,000 g/mol or more.

2. The heat-resistant SAN resin according to claim 1, wherein the vinyl cyanide compound comprises one or more selected from the group consisting of acrylonitrile, methacrylonitrile and ethacrylonitrile.

3. The heat-resistant SAN resin according to claim 1, wherein the hydroxyalkyl (meth)acrylate comprises one or more selected from the group consisting of hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate.

4. The heat-resistant SAN resin according to claim 1, wherein the heat-resistant SAN resin has an oligomer content of 0.1 to 0.8% by weight.

5. A method of producing a heat-resistant SAN resin comprising a step for bulk polymerizing ingredients comprising 52 to 78% by weight of alpha-methylstyrene, 20 to 40% by weight of a vinyl cyanide compound and 2 to 8% by weight of hydroxyalkyl (meth)acrylate,
wherein the bulk polymerization has a polymerization conversion rate of 63 to 76%.

6. The method according to claim 5, wherein the bulk polymerization is continuous polymerization.

7. The method according to claim 5, wherein the bulk polymerization is carried out at 105 to 120° C.

8. A heat-resistant SAN resin composition comprising:
a heat-resistant SAN resin polymerized using ingredients comprising 52 to 78% by weight of alpha-methylstyrene, 20 to 40% by weight of a vinyl cyanide compound and 2 to 8% by weight of hydroxyalkyl (meth)acrylate, wherein the heat-resistant SAN resin has a weight average molecular weight of 79,000 g/mol or more; and
an ABS resin.

9. The heat-resistant SAN resin composition according to claim 8, wherein the heat-resistant SAN resin is present in an amount of 60 to 90% by weight and the ABS resin is present in an amount of 10 to 40% by weight.

10. The heat-resistant SAN resin composition according to claim 8, wherein the heat-resistant SAN resin composition has a tensile elongation of 23% or higher.

11. The heat-resistant SAN resin composition according to claim 8, wherein the heat-resistant SAN resin composition has an impact strength of 19 J/m or higher.

12. The heat-resistant SAN resin composition according to claim 8, wherein the heat-resistant SAN resin composition has an environmental stress cracking resistance (ESCR) of 28 seconds or longer,
wherein the ESCR is a crack generation time measured after applying a thinner to the center of a specimen using a 1% strain jig.

13. An article produced from the heat-resistant SAN resin composition according to claim 8.

14. The heat-resistant SAN resin composition of claim 8, wherein the heat-resistant SAN resin has an oligomer content of 0.1 to 0.8% by weight.

* * * * *